July 21, 1936.　　　T. B. TYLER　　　2,048,206
TRANSMISSION
Filed June 8, 1932　　　2 Sheets-Sheet 2
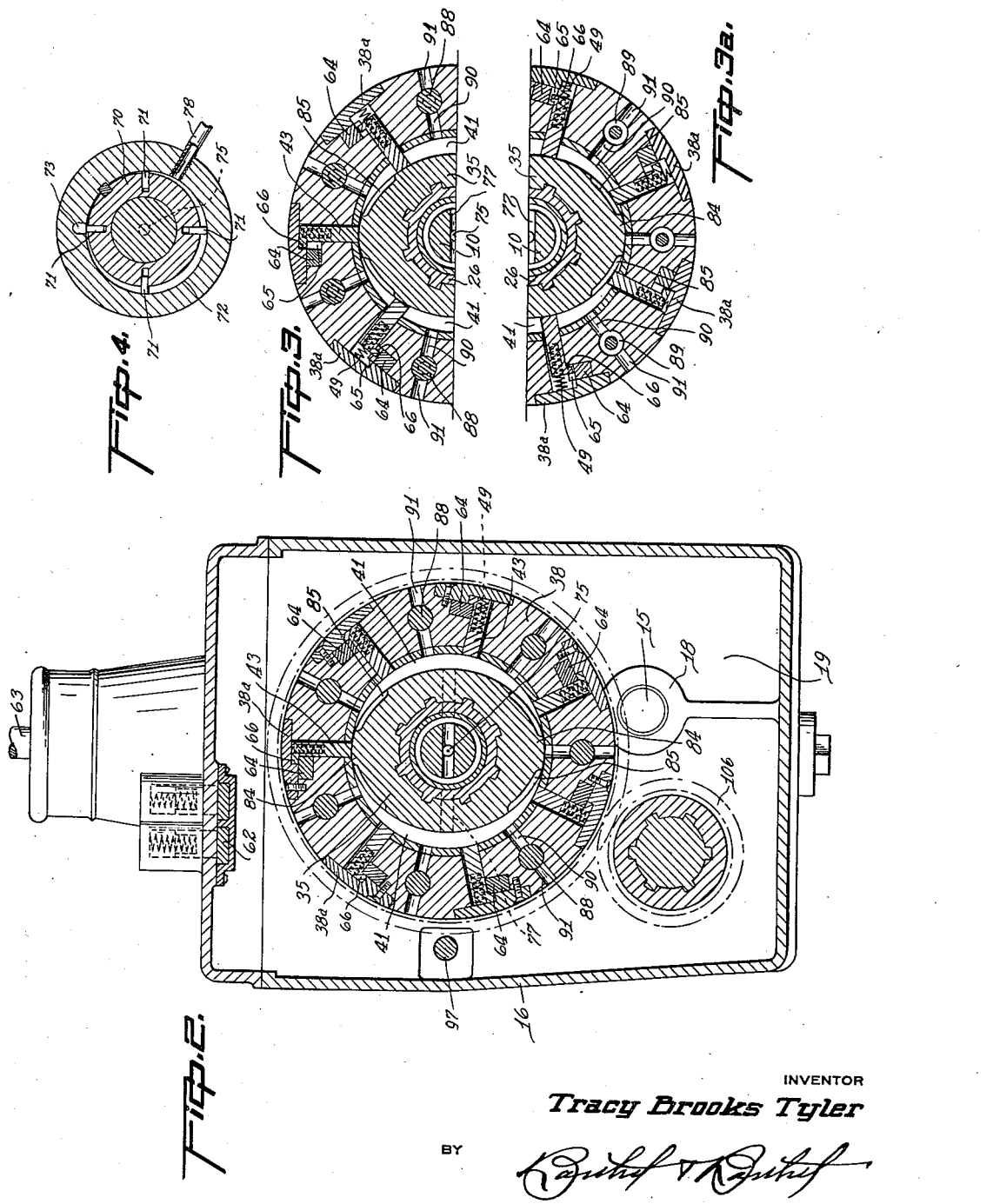
INVENTOR
Tracy Brooks Tyler
BY
ATTORNEYS Patented July 21, 1936

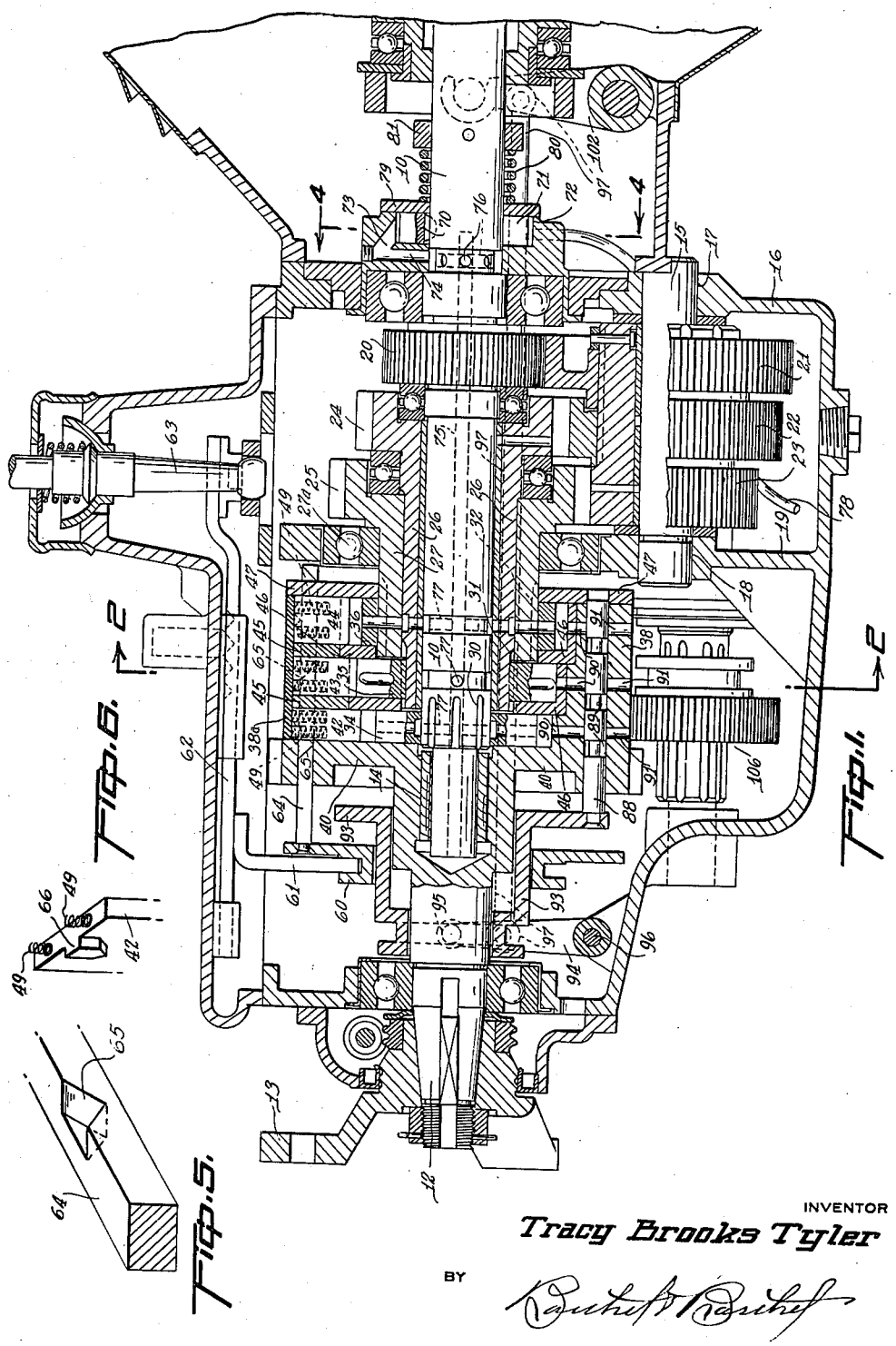

2,048,206

UNITED STATES PATENT OFFICE 2,048,206

TRANSMISSION

Tracy Brooks Tyler, Detroit, Mich., assignor to The Monopower Corporation, Detroit, Mich., a corporation of Michigan Application June 8, 1932, Serial No. 616,141

7 Claims. (Cl. 192—58)

This invention relates to transmissions and more particularly to transmissions employing fluid clutches as engaging means for selectively connecting torque changing mechanism to the driven part.

The transmission here disclosed is an improvement over the one disclosed in my copending application Serial No. 611,384 filed May 14, 1932, and therefore, reference will be had to that application for a full understanding of the invention of this application, it being understood that except for the improvements here shown, the transmissions are similar.

The principal object of this invention is to provide a transmission like the transmission of the first mentioned application but differing therefrom in that the engaging elements are in the nature of fluid clutches.

A secondary object of this invention is to provide a transmission having selective fluid clutches, with novel means for effecting selection and engagement of clutches.

Still further objects of the invention will become apparent upon reference to the following detailed description, and to the appended drawings, in which Figure 1 shows one embodiment of the invention in longitudinal vertical section;

Fig. 2 is a transverse section through the intermediate speed clutch and is as if on line 2—2 of Fig. 1, the parts being shown in non-driving relation;

Fig. 3 is a fragmentary transverse section view through a clutch, the parts being shown in relatively driving position;

Fig. 3a is a similar view, certain of the parts being shown in relatively driving position, and other parts being shown in position to vent the clutch of its driving fluid, thereby destroying the driving relation;

Fig. 4 is a transverse section of a fluid pump for use with the transmission and is a section as if on the line 4—4 of Fig. 1;

Fig. 5 is a fragmentary perspective view of a selector;

Fig. 6 is a fragmentary perspective view of a vane.

Referring to the drawings and more particularly to Fig. 1, it will be seen that the transmission of this figure includes a suitably journaled main shaft 10 connected to the engine of the vehicle through a conventional master clutch, not shown. The torque transmitting elements, to be described in detail below, are adapted to create a driving connection between the main shaft and a suitably journaled second shaft 12 adapted to be connected to a propeller shaft, not shown, through a coupling 13. The second shaft is cupped as at 14 to be journaled on the main shaft 10. A countershaft 15 journaled in the transmission casing 16 at 17, and also journaled at 18 in a partition 19 formed integral with the casing, is also provided and in effect corresponds to the countershaft of a conventional transmission. Formed integral with the main shaft 10 is a gear 20 in constant mesh with a gear 21 of the countershaft and the latter further has gears 22 and 23 of different size, as shown, these constantly meshing with gears 24 and 25, also of different size, as shown, provided with relatively telescoping sleeves 26 and 27 journaled on a stationary ball bearing 27a in partition 19, which journals the shaft 10 as well. Suitable thrust and journal bearings for the various parts are provided and are not referenced, since their construction forms no part of the invention.

The shaft 10 and the sleeves 26 and 27 are provided with longitudinally spaced external splines 30, 31 and 32 respectively, on which are splined three longitudinally spaced oval rotors 34, 35 and 36, these being the normally driving rotors of fluid clutches having a common normally driven member comprising a thick walled annulus or shell 38 formed integral with the shaft 12 and connected to the body portion thereof by an annular web 40. The casing or shell is made long enough to surround all of the rotors, as shown, and it is spaced from them by spaces 41 as shown in Fig. 2.

The driving connection between the shell 38 and the rotors 34, 35 and 36 is effected by a plurality of sets of vanes 42, 43 and 44 radially slidable in slots in the shell 38 capped by parts 38a and these vanes are adapted to project into the spaces 41 and abut on the outer surfaces of the eccentrically shaped rotors 34, 35 or 36. The sets of vanes and the rotors corresponding thereto are relatively isolated by sealing partitions including annular portions 45 integral with the shell 38 and dished plates 46 disposed as shown, and the otherwise open end of the shell is closed by an end plate 47 sealing the shell and the driving parts therewithin from the interior of the transmission casing 16.

When one or another of the sets of vanes 42, 43 and 44 are pressed inwardly, towards the rotors, by compression springs 49, of which there are two to each vane, the liquid or other fluid in the spaces 41 between the shell and that rotor which corresponds with the projected vanes, creates a fluid engagement between the rotor and the shell, and serves to transmit rotary motion from the driving part on which it is splined, namely the shaft 10 or the sleeves 26 and 27, to the shell.

It is obvious that some means must be provided to permit the operator to select which of the sets of vanes will be projected inwardly, in order to permit selection of the driving means for the shell 38 and such selecting means will now be described. Movable transversely of the transmission and rigidly mounted on selector rods to be described is a grooved shifter collar 60 connected by a yoke 61 to a slidable shift rail 62, actuated by the shift lever or other operator controlled means 63, the shift rail being moved longitudinally and controlled by means more clearly shown in application Serial No. 614,349, filed May 31, 1932, which means forms no part of the present invention.

To the shifter collar 60 and projecting forwardly therefrom are a plurality of selectors 64 spaced peripherally at equal distances about the aligned axes of the shafts 10 and 12. These selectors pass through the thick wall of shell 38, and the end plate 47 and are slidable along with the grooved collar 60 in a direction parallel to the axes of the shafts 10 and 12. On those edges of the selectors which are in face to face engagement with the shell grooves and the faces of the vanes 42, 43 and 44 are three annular rows of V-shaped notches (Fig. 5) 65, any annular row of which, at any one time as desired, is adapted to register with one of three annular rows of V-shaped lugs 66 (Fig. 6) formed on the vanes 42, 43 and 44. When a notch 65 is registered with a lug 66 on a vane (Figs. 3 and 3a) the compression springs 49 will project the vane radially inwardly into the fluid filled spaces 41 until the vane is engaged by a rotor. At other times the vanes are held outwardly, due to the lugs 66 resting on the outer surfaces of the selectors (Fig. 2) and no driving relation is established. It will be seen that the notches 65 and the vane lugs 66 are spaced so that one and only one, if any, annular row of notches 65 on the selectors will be in line with an annular row of vane lugs at any one time. In this fashion a drive connection between the shell 38 and one of the rotors at any one time may be effected, the other rotors being non-operable to transmit torque to the shell because of the fact that their vanes are held up by the lugs 66 engaging on the upper surface of the selector 64. It will also be seen that the selectors not only permit the vanes to move inwardly, but also operate to withdraw the vanes, when properly moved, the notches being "V-shaped" for this purpose.

A feature of the selector mechanism lies in its ability to "pick up" or select a rotor with but an extremely small movement of the selectors. Accordingly no more than a slight movement of the shift lever 63 or other shifting manipulator is necessary to accomplish a selection of or "pick up" a rotor for driving the driven shaft. Further, selection and "pick up" is accomplished silently since the engagement is through fluid clutches instead of positive tooth clutches or sliding gear meshing.

In order that the spaces 41 between the rotors and the shell 38 be at all times filled to capacity with driving liquid or other fluid, a rotary pump, shown in Figs. 1 and 4, is provided and the same includes a rotor 70 secured to shaft 10 and having sliding vanes 71 for pumping fluid from the eccentrically shaped chamber 72 through a port 73 and a radial passage 74 into an axial bore 75 formed in the shaft 10, the latter having radial passages 76 for connecting the bore 75 with the passage 74. The bore at its rear end near the rotors, is provided with three sets of radial outlets 77 passing through the rotors into spaces 41 and serving to connect the interior of the pump chamber 72 with the spaces between the rotors and the shell 38. The inlet for the pump comprises a conduit 78 having its lower end in the lower part of the transmission casing and its upper end opening into the pump chamber 72, the latter pumping the lubricant or other fluid from within the transmission casing into the spaces 41. The pump is designed to operate and to supply fluid to the spaces at a constant and low pressure and in order to prevent a high pressure being built up within the pump, one end of the pump is formed as a movable wall 79 held against the pump casing to close the chamber by a compression spring 80 abutting the fixed collar 81 on shaft 10. If the pressure in the pump exceeds a predetermined amount the end plate 79 is forced away from the casing against the influence of the spring 80 to relieve the pressure in the pump, and permit escape of excess fluid in capacity volume.

In order to prevent too great a fluid pressure being built up in the spaces 41 near the eccentric sealing portions 84 of the rotors, reliefs 85 are cut into the peripheral surfaces of the rotors. The reliefs 85 permit a part of the fluid which is trapped between the rotor portions 84 and a vane to by-pass beneath the vane to avoid the building up of extraordinary pressures.

One of the features of the invention lies in the fact that the rotors of the driving clutches and consequently the sleeves 26 and 27, the shaft 10, the countershaft 15, and all of the gears within the transmission are completely disconnected from the propeller shaft when the latter is rotating freely and the master clutch, not shown, disengaged as on coasting. This is accomplished by a connection between the means for disengaging the master clutch and a means for permitting escape of the fluid from the spaces 41 between the rotors and the shell, it being observed that when the fluid in the clutches is allowed to escape the rotors will not be rotated by the shell under these conditions.

The means for permitting the escape of fluid from the rotor spaces 41 includes a group of longitudinally slidable parallelly disposed plungers 88 having annular grooves 89 adapted to register with aligned ports 90 and 91 and when registered to open the interior of the shell to the interior of the transmission casing through the ports 90, 91 and grooves 89. Normally, that is to say, when the master clutch is engaged the plungers 88 are in their retracted position, Fig. 1. However, when the clutch is disengaged the plungers are advanced, to register their grooves 89 with the ports 90, 91 (Fig. 3a), by a collar 93 to which the plungers are secured. The collar may be moved forwardly by an arm 94 yoked to the collar at 95 and rotated on a cross shaft 96 by a link 97 connected to yoke 94 and a rocker yoke 102 and through parts partially shown but not referenced, and more fully shown and described in the copending application above referred to, to the means for actuating the master clutch.

The operation of these parts is as follows: When the master clutch actuating means is moved to clutch disengaged position, yoke 102 is rotated clockwise Fig. 1, and link 97 is pulled to the right, thus causing advance of plungers 88 and escape of fluid from the shell. When the master clutch is moved to clutch engaged position the plungers 88 are retracted to stop free escape of the fluid from the shell and a driving connection between the selected rotor and the shell 38 will once more be established.

Means for reversing the direction of rotation of the web 40 and of the shaft 12 with respect to the shaft 10, for reverse movement of the vehicle, are referenced generally at 106 and since such means are clearly shown and described in the copending application above referred to, and since such means form no part of the present invention they will not be described in detail at this time.

It will be observed that when the operator wishes to change the driving relation between the shaft 10 and shaft 12 he can do so silently and in any forward speed of the vehicle merely by moving the controller or lever 63 to a desired position which, translated through the selectors 64, permits a desired set of vanes to create a driving connection between the selected rotor and the shell, whereupon the driving part 10, 26 or 27, connected to the selected rotor will be in operative engagement with the shell. Silence is assured by the fact that no meshing of sliding gears or other toothed elements, is necessary to accomplish driving relation.

It will further be observed that when any rotor is in driving relation with a shell there is no flow of fluid within the rotor. The fluid remains immovable or stationary between the various vanes of a set and acts as an immovable solid for transmitting torque between the rotor and the shell, through the vanes and sealing portions 84. Accordingly no emulsification or heating of the fluid in the clutches takes place such as occurs in other types of fluid actuated torque transmitting means employing flowing or pumped fluids.

It will be further noted that the clutches are operable to transmit torque from the rotors to the shell when the engine is driving the propeller shaft or to transmit torque from the shell to the rotors when the engine is used to brake retard the propeller shaft.

It will further be noted that when the clutches are released, the vanes are retracted and accordingly there can be no churning or agitation of the fluid in and circulating through the clutches at this time, with consequent ill effects.

Now having described the invention and a preferred embodiment of the same, reference will be had to the following claims which define the scope of the invention.

What I claim is:

1. In a clutch, a hollow member, an eccentric rotor loosely received within said hollow member, means for supplying fluid to said hollow member, a set of vanes slidably mounted in said hollow member, means for moving said vanes to cause engagement thereof with said rotor, means for retracting said vanes and for holding them out of contact with said rotors, and means for discharging said fluid from said hollow member.

2. In a clutch, a hollow member, an eccentric rotor loosely received within said hollow member, means for supplying fluid to said hollow member, a set of vanes slidably mounted in said hollow member, means for moving said vanes to cause engagement thereof with said rotor, means for retracting said vanes and for holding them out of engagement with said rotor, and manually controlled means for discharging said fluid from said hollow member.

3. A clutch comprising a driven member formed with a fluid receiving compartment, a drive member rotatably mounted in said compartment and adapted to impel movement of the fluid therein, members carried by said driven member in said compartment and adapted to extend into the fluid therein, personally operable means for retracting said members out of said fluid, and means for exhausting said fluid from said compartment.

4. A clutch comprising a driven member formed with a fluid receiving compartment, means for supplying fluid to said compartment, a drive member rotatably mounted in said compartment and adapted to impel movement of the fluid therein, members carried by said driven member in said compartment and adapted to extend into the fluid therein, personally operable means for retracting said members out of said fluid, and personally operable means for exhausting said fluid from said compartment.

5. A clutch comprising a hollow driven member having separated compartments, means for supplying fluid to said compartments, rotors mounted in each compartment and adapted to impel movement of the fluid therein, sets of members carried by said driven member in each compartment and adapted to be projected into the fluid therein to establish a driving connection between said driven member and the rotors in said compartments, means for selectively controlling the projection of said members to establish a driving connection between said driven member and the rotor corresponding to the selected members, and means for preventing a driving connection between any of said rotors and said driven member, said last named means being independent of said selecting means and operating without altering the relationship of a pre-selected set of members.

6. A clutch comprising a hollow driven memmember having separated compartments, means for supplying fluid to said compartments, rotors mounted in each compartment and adapted to impel movement of the fluid therein, sets of members carried by said driven member in each compartment and adapted to be projected into the fluid therein to establish a driving connection between said driven member and the rotors in said compartments, means for selectively controlling the projection of said members to establish a driving connection between said driven member and the rotor corresponding to the selected members, and means for exhausting the fluid from all of said compartments simultaneously to prevent establishment of a driving connection without altering the selection of a pre-selected set of members.

7. A clutch for connecting driving and driven members, said clutch comprising a casing connected to one of said members, a rotor connected to the other of said members, a fluid medium for the space between said rotor and casing, means for introducing the fluid medium into the space, vanes adapted to be projected into and retracted from said fluid, resilient means normally urging said vanes into said fluid medium, means for retracting said vanes, said casing having ports therein for exhausting the fluid medium therefrom, valves controlling said ports, and separately operable controls for independently actuating said means for retracting said vanes and said valves.

TRACY BROOKS TYLER.